United States Patent [19]

Sagalovich

[11] Patent Number: 5,655,269
[45] Date of Patent: Aug. 12, 1997

[54] ADJUSTABLE CLAMPING DEVICE

[75] Inventor: Emil S. Sagalovich, Thornhill, Canada

[73] Assignee: Dyalem Concepts Inc., Kanata, Canada

[21] Appl. No.: 512,197

[22] Filed: Aug. 7, 1995

[51] Int. Cl.$^6$ .................................................. B65H 59/16
[52] U.S. Cl. ...................... 24/115 R; 403/314; 188/65.1; 188/65.3; 24/115 N
[58] Field of Search ................................ 24/265 EE, 269, 24/284, 286, 115 N, 115 R; 285/305; 403/314, 300; 188/65.1, 65.3

[56] References Cited

U.S. PATENT DOCUMENTS

| | | | |
|---|---|---|---|
| 222,649 | 12/1879 | Batchelder . | |
| 849,983 | 4/1907 | Denlea . | |
| 2,249,119 | 7/1941 | Di Palma | 24/115 N |
| 2,681,781 | 6/1954 | Kellems | 24/115 N |
| 2,821,739 | 2/1958 | Mohs | 16/114 |
| 2,936,625 | 5/1960 | Heiseler | 74/1 |
| 3,107,966 | 10/1963 | Bonhomme | 339/241 |
| 3,216,682 | 11/1965 | Lewis | 248/60 |
| 3,335,469 | 8/1967 | Shand et al. | 188/65.1 |
| 3,561,071 | 2/1971 | Schlein | 24/115 N |
| 3,573,346 | 4/1971 | Appleby | 174/71 |
| 3,921,257 | 11/1975 | Appleby et al. | 24/115 N |
| 4,044,863 | 8/1977 | Feldman | 188/65.1 |
| 4,066,368 | 1/1978 | Mastalski | 24/115 N X |

*Primary Examiner*—Peter M. Cuomo
*Assistant Examiner*—Stephen Vu
*Attorney, Agent, or Firm*—Donald E. Hewson

[57] ABSTRACT

An adjustable clamping device for receiving and selectively frictionally engaging an internally disposed inserted member, such as a rope or rod, is disclosed. The clamping device comprises a flexible and readily deformable gripping member of a hollow cylindrical shape, disposed about a generally centrally located first longitudinal axis. The gripping member may comprise a substantially solid sheet of flexible material, or may comprise a mesh material, or may comprise a plurality of flexible strand members. The material for the gripping member may be leather, rubber, synthetic rubber, neoprene, cloth, nylon, rayon, kevlar, or metal, as appropriate. The gripping member is twistably deformable between a straight neutral configuration and a plurality of helically twisted configurations whereat the gripping member reduces in diameter and encloses down onto the inserted member. When the gripping member is twistably deformed from its straight neutral configuration to a helically twisted configuration, it correspondingly reduces in length. First and second handle members in the form of hollow elongate circular cylinders, with the first handle member freely rotatably engaged within the second handle member, are attached one to each end of the gripping member and are biased one away from the other by a coil spring interconnected therebetween, thereby urging the gripping member to a taut condition. In use, the first and second handle members are turned one with respect to the other so as to cause the gripping member to be in a corresponding helically twisted configuration, thus reducing in diameter and thereby frictionally engaging the inserted member.

18 Claims, 4 Drawing Sheets

ADJUSTABLE CLAMPING DEVICE

FIELD OF THE INVENTION

This invention relates to clamping devices for use in retaining a centrally disposed elongate inserted member, such as a rope or rod, and applying a selective amount of frictional force to the inserted member in an evenly distributed manner. More particularly, this invention relates to such clamping devices where such an inserted member is movable through the clamping member at a generally predetermined speed, irrespective of the pulling force acting on the inserted member.

BACKGROUND OF THE INVENTION

Clamping devices exist in many different forms and are used in a wide variety of applications. Further, clamping devices that retain a centrally elongate inserted member, such as a rope or rod, and applying an amount of friction to the inserted member, so as to either securely retain the inserted member—which is in essence a static clamping device—or permit controlled relative movement of the inserted member with respect to the clamping device—which is in essence a dynamic clamping device—are known in many different forms.

One example of a use of such a static clamping device is a workpiece clamping device wherein an object, such as an elongate metal or plastic pipe, could be firmly retained for working on. Most presently available clamping devices, such as a vice, utilize opposed clamping members made from a rigid material and, therefore, tend to mark or in some way disfigure the outer surface of a retained workpiece. What is needed is a static clamping device wherein a relatively soft gripping member applies generally even pressure around an object in order to grip that object, even grip the object tightly, without causing damage to the outer surface of the object.

Further, clamping devices for very gently clamping objects, with a selective and entirely controlled pressure, are generally not known. For example, when a person has fractured a bone in an appendage, an arm for instance, it would be useful to gently restrain the arm in a proper position until a conventional east or the like can be applied. Such gentle restraint of the arm could be accomplished by applying a pressure that is gentle, selectively controllable, and that is relatively evenly distributed around the arm and along the length of the arm.

Various applications require that a clamping device be used in a dynamic situation where the inserted workpiece, such as a rope, is purposely drawn through the clamping device—or the clamping device is drawn along the inserted member—so as to provide a frictional interface between the clamping device and the inserted member. One example of a dynamic clamping device is cable type exercise equipment. Various types of friction based dynamic clamping type cable exercise devices exist—it is beyond the scope of the present application to explain these devices in detail. Basically, a cable or rope is frictionally engaged by a selectively tightenable clamping means. The problem with such prior art exercise devices is that the amount of frictional force is constant for any given setting. Therefore, in use, pulling on the cable or rope with a greater force will result in the cable or rope being pulled through the clamping mechanism at a greater speed. This may be undesirable as it is very often desirable to control the rate of relative speed of the clamping mechanism and the cable.

Another use for a dynamic clamping device is an emergency fire escape where a harness or similar apparatus having one or more clamping mechanisms installed thereon frictionally engages a rope hanging down the exterior of a building so as to permit the harness or similar to, in essence, slide down the rope in a controlled manner at a pre-selected speed. Such emergency fire escapes would allow for the escape down the exterior of a building that perhaps has a couple of interior stairways that are unusable due to fire or smoke.

DESCRIPTION OF THE PRIOR ART

U.S. Pat. No. 3,216,682 to LEWIS discloses a cable grip support wherein a relatively small diameter cable 5 is retained within a vertically disposed conduit riser 1 by way of a wire strand grip 6. The wire strand grip 6 is in the form of a tubular open mesh body 29 formed from a plurality of wire strands 28 spirally interwoven with each other about a common central axis. The grip 6 is hung downwardly from an annular head member 7 supported ultimately by the conduit riser 1. The diameter of the tubular open mesh body 29 must be small enough to frictionally engage the entire perimeter of the cable 5 disposed therewithin. The weight of the cable 5, which cable 5 frictionally engages the grip 6, causes the spiral wire strands 28 of the grip 6 to be pulled longitudinally along the length of the grip 6, which accordingly decreases the diameter of the grip 6, thus tightening the grip 6 onto the cable 5, and thus increasing the friction between the grip 6 and the cable 5. The heavier the cable 5 is, the more tightly the grip 6 will grip the cable 5 (for a given diameter cable and a given diameter of the tubular open mesh body 29 that forms the grip 6, and for given materials).

The device as taught in the patent to LEWIS discloses minor similarities to the present invention in that it teaches the use of two opposed forces—one being gravity, ultimately acting on the grip 6, and the other one being the oppositely directed resultant force acting on the annular head member 7—to cause a gripping member, namely the grip 6, to tightly frictionally engage an inserted member, namely the cable 5. In the LEWIS apparatus as disclosed, it is necessary to use the force of gravity acting on the cable 5—in other words, the weight of the cable 5—in order to cause incipient movement of the cable 5 within the grip 6. This incipient movement of the cable 5 permits the friction between the grip 6 and the cable 5 to cause initial longitudinal tension within the grip 6 which tension causes corresponding lengthening of the grip 6. Accordingly, the grip 6 decreases in diameter so as to cause the grip 6 to have a gripping force on the cable 5. In this manner, the apparatus disclosed in the LEWIS patent is, in essence, initially dynamically actuated, as it requires incipient movement of the cable 5 within the grip 6. This incipient movement is caused by gravity, as explained, or it may be caused by another external force acting on the cable 5, such as pulling of the cable 5. Once the cable 5 has been gripped by the grip 6, there is no further movement of the cable 5, until the cable 5 is purposely released. The grip 6 does not grip the cable 5 unless there is incipient movement of the cable 5 within the grip 6.

It can be seen that the factors that ultimately determine the gripping force on the cable 5 are the downward force of the cable 5 and the relative diameters of the cable 5 and the grip 6. Therefore, it is not realistic to have selective control or adjustment of the gripping force of the grip 6 on the cable 5.

It is not taught in the LEWIS patent to have the apparatus itself cause the application of an initial gripping force by the gripping member (the grip 6) to the internally disposed central member (the cable 5). Nor is it taught to be able to selectively adjust the force of the gripping member on the inserted member, which selective adjustment would permit corresponding selection of the friction between the gripping member and the inserted member. It is also not taught to use a solid piece of material for the gripping member, nor is it taught to rotate an outer sleeve with respect to the gripping member to reduce the effective diameter of the gripping member in order to provide adjustability in terms of gripping force. Such adjustability could not be achieved with the device disclosed in the LEWIS patent.

U.S. Pat. No. 2,936,625 to HEISLER discloses a self-tightening gripping device having substantially identical tubular members 22, 24, co-axially aligned one with the other in end to end relation such that the cam portions 32, 34 are opposed one another. A helically coiled spring 20 is retained within the interior of the tubular members 22, 24, with one end of the coiled spring 20 securely anchored at a hole 26 in the tubular member 22 and the opposite other end of the coiled spring 20 anchored at a hole 28 in the tubular member 24. An object to be gripped, such as rod 30, is inserted into the interior of the coiled spring 20. The two tubular members 22, 24 can be rotated one with respect to the other so as to tighten the coiled spring 20 on the rod 30, thus frictionally engaging the coiled spring 20 onto the rod 30. Shoulders 38, 40 on the tubular members 22, 24, respectively, keep the two tubular members 22, 24 from rotating with respect to one another under the influence of the tightened coiled spring. In use, the two tubular members 22, 24 are pulled apart longitudinally with respect to one another, are rotated slightly so that the shoulders 38, 40 pass one another slightly, and the two tubular members 22, 24 are released so that the two cam surfaces 32, 34 engage each other. The elongated coil spring 20 pulls the two tubular members 22, 24 together. The slope of the two cam surfaces 38, 40 cause rotation of the two tubular members 22, 24, which rotation tightens the coiled spring 20 onto the rod 30. The apparatus as disclosed in the HEISLER patent utilizes a single element—namely the coiled spring 20—to bias the two tubular members 22, 24 with respect to each other and also grip the rod 30; however, the coiled spring 20 as disclosed cannot, by itself, concurrently bias the two tubular members 22, 24 towards each other—which requires the coiled spring 20 to tend to shorten and therefore increase in diameter—and also tighten onto the rod 30. For this reason, it is necessary to include the sloped cam surfaces 38, 40 to cause the two tubular members 22, 24 to rotate so as to tighten the coiled spring onto the rod as the two tubular members are pulled towards each other. It can be seen that it is necessary to include the cam surfaces 38, 40 in order for the apparatus as disclosed in the HEISLER patent to function. Therefore, this apparatus is only incrementally adjustable, and not infinitesimally adjustable. Further, it does not disclose the use of a solid material gripping member, nor a flexible and readily deformable gripping member.

SUMMARY OF THE INVENTION

In accordance with one aspect of the present invention, there is provided an adjustable clamping device for receiving and selectively frictionally engaging an internally disposed inserted member. The clamping device comprises a flexible and readily deformable elongate gripping member having a generally hollow cylindrical shape, disposed about a generally centrally located first longitudinal axis. The flexible and readily deformable elongate gripping member is twistably deformable between a straight neutral configuration and a helically twisted configuration. The flexible and readily deformable elongate gripping member has a first end and a second end, which first and second ends define a full length when the flexible and readily deformable elongate gripping member is in the straight neutral configuration and which first and second ends define a corresponding proportionally reduced length when the flexible and readily deformable elongate gripping member is in the helically twisted configuration. A first handle member is secured to the first end of the flexible and readily deformable elongate gripping member and a second handle member secured to the second end of the flexible and readily deformable elongate gripping member, with the first and second handle members being operatively engaged one with the other for relative rotational movement one with respect to the other about the first longitudinal axis, to any one of a plurality of adjustment positions, which rotational movement causes the flexible and readily deformable elongate gripping member to twistably deform between the straight neutral configuration and the helically twisted configuration. A spring biasing means is operatively interconnected between the first and second handle members so as to bias the first and second handle members, thereby urging the flexible and readily deformable elongate gripping member to a taut condition while in the helically twisted configuration. In use, when the first and second handle members are in a selected one of the plurality of adjustment positions so as to cause the flexible and readily deformable elongate gripping member to be in a corresponding helically twisted configuration, the flexible and readily deformable elongate gripping member is correspondingly peripherally contracted around the inserted member so as to frictionally engage the inserted member.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Reference will now be made to FIGS. 1 through 4, which show a preferred embodiment of the adjustable clamping device 20 of the present invention. The adjustable clamping device 20 is for receiving and selectively frictionally engaging an internally disposed inserted member 22, which is typically a rope, a rod, or the like. The inserted member 22 may be of virtually any form—that is to say, virtually any cross-section or regular shape of outer surface—, and also may be of a wide variety of suitable materials.

The clamping device 20 comprises a flexible and readily deformable gripping member 30 of a generally hollow cylindrical shape, preferably circular in cross-section. The gripping member 30 is disposed about a generally centrally located axis "A", is elongate along the first longitudinal axis "A", and is typically of a length of about eight centimeters to about twenty centimeters for most applications and embodiments, but can be of most any size. There is a lower limit to the length of the gripping member 30 in that it can not be made extremely small as there will be too little material to properly grip the inserted member 22. Lengths of less than one centimeter are, indeed, quite possible, depending on the diameter of the gripping member 30.

In the preferred embodiment, the gripping member 30 comprises a substantially solid sheet of flexible material so as to be able to apply gripping pressure to the inserted member 22, with the pressure being applied in as evenly distributed a manner as possible. In order to properly grip an inserted member 22, the gripping member 30 must be made of a flexible and readily deformable material so that the gripping member 30 can be twistably deformed and will decrease in diameter so as to collapse onto the inserted member 22, and will generally conform to and hug the outer surface of the inserted member 22, as will be discussed in greater detail subsequently. It has been found that the solid gripping member of the preferred embodiment can be made from leather, rubber, synthetic rubber, neoprene, or cloth, among other materials.

Figure 5:
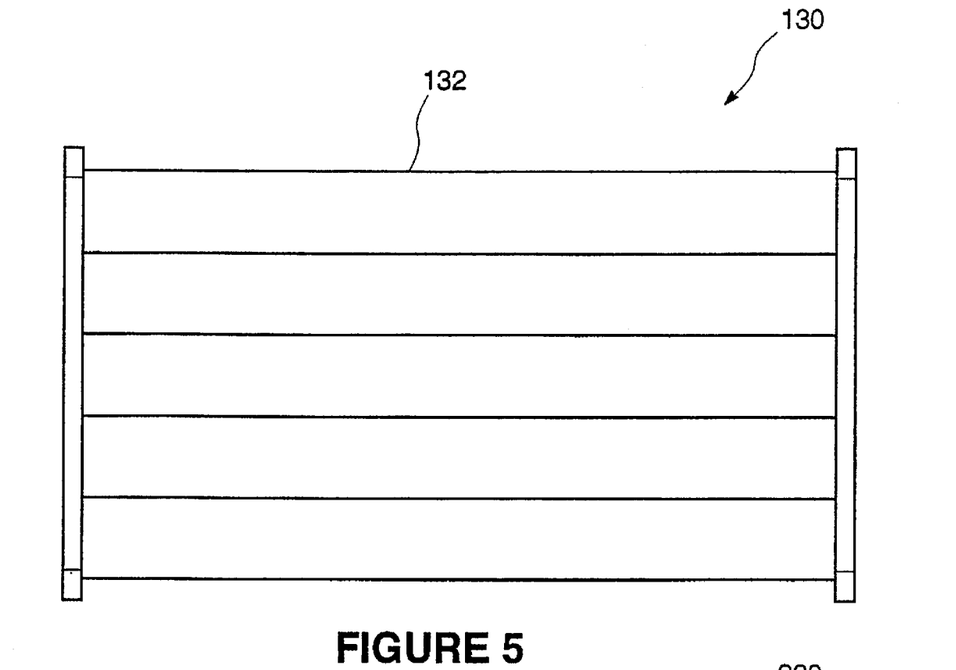
FIG. 5 is a perspective diagrammatic representation of an alternative embodiment gripping member.
Figure 6:
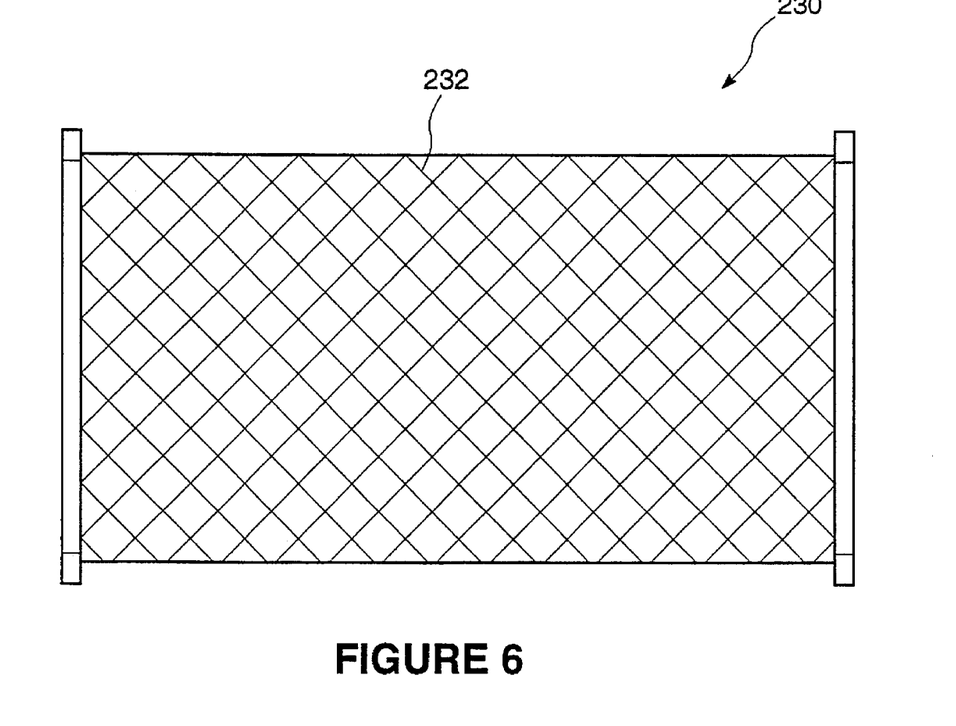
FIG. 6 is a perspective diagrammatic representation of another alternative embodiment gripping member.

In an alternative embodiment, as shown in FIG. 5, a gripping member 130 comprises a plurality of flexible strand members 132. These flexible strand members 132 together form the gripping member 130 having a generally hollow cylindrical shape, disposed about a generally centrally located first longitudinal axis "A'". In another alternative embodiment, as shown in FIG. 6, a gripping member 230 comprises a mesh material 232 in the form of a generally hollow cylindrical shape, disposed about a generally centrally located first longitudinal axis "A''". In these two alternative embodiments, the material could be leather, rubber, synthetic rubber, neoprene, cloth, nylon, rayon, kevlar, or stranded metal, among other materials like ball-in-ball steel strings usually used for controlling vertical or horizontal blinds. It is necessary that the material be flexible and readily deformable so as to generally conform to the outer surface of an inserted member.

Figures 1, 3, 4:
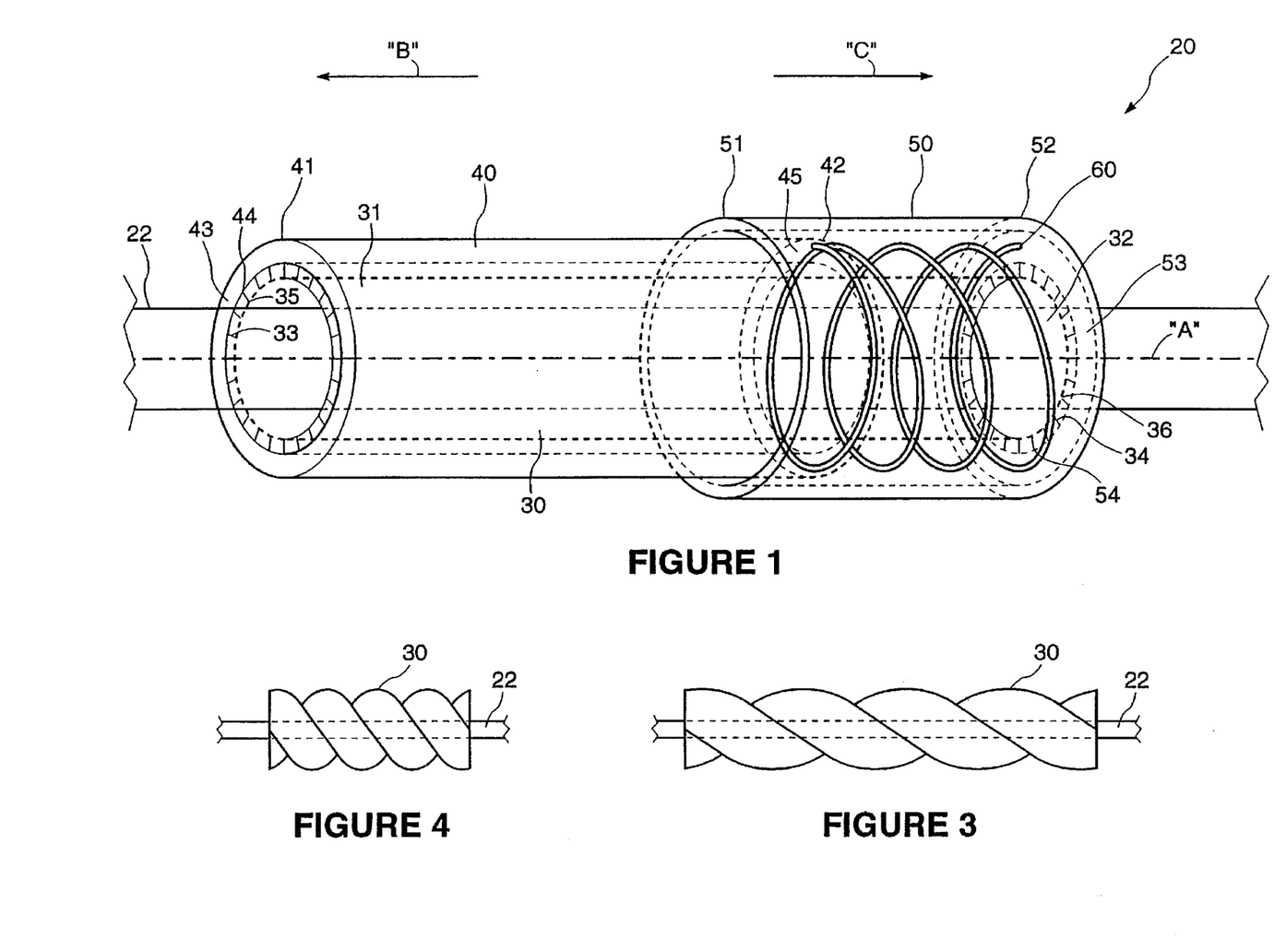
FIG. 1 is a perspective diagrammatic representation of the preferred embodiment of the clamping device of the present invention.
FIG. 3 is a perspective diagrammatic view similar to FIG. 1, showing gripping member in a helically twisted configuration.
FIG. 4 is a perspective diagrammatic representation of the gripping member helically twisted to a greater degree than is shown in FIG. 3.

The gripping member 30 has a straight neutral configuration, as shown in FIG. 1, and is twistably deformable between that straight neutral configuration and a plurality of helically twisted configurations. In the straight neutral configuration, the gripping member 30 is of a generally constant diameter. In a helically twisted configuration, the central portion of the gripping member 30 reduces in diameter so as to, in use, come into contact with the outer surface of the inserted member 22. The overall shape of the gripping member 30 in its helically twisted configurations, is similar to a hyperboloid, or at least as close as reasonably possible considering that the generally flat material that is being used has been deformed by twisting and may no longer have a flat outer surface but may have a helically striated surface.

Figure 2:
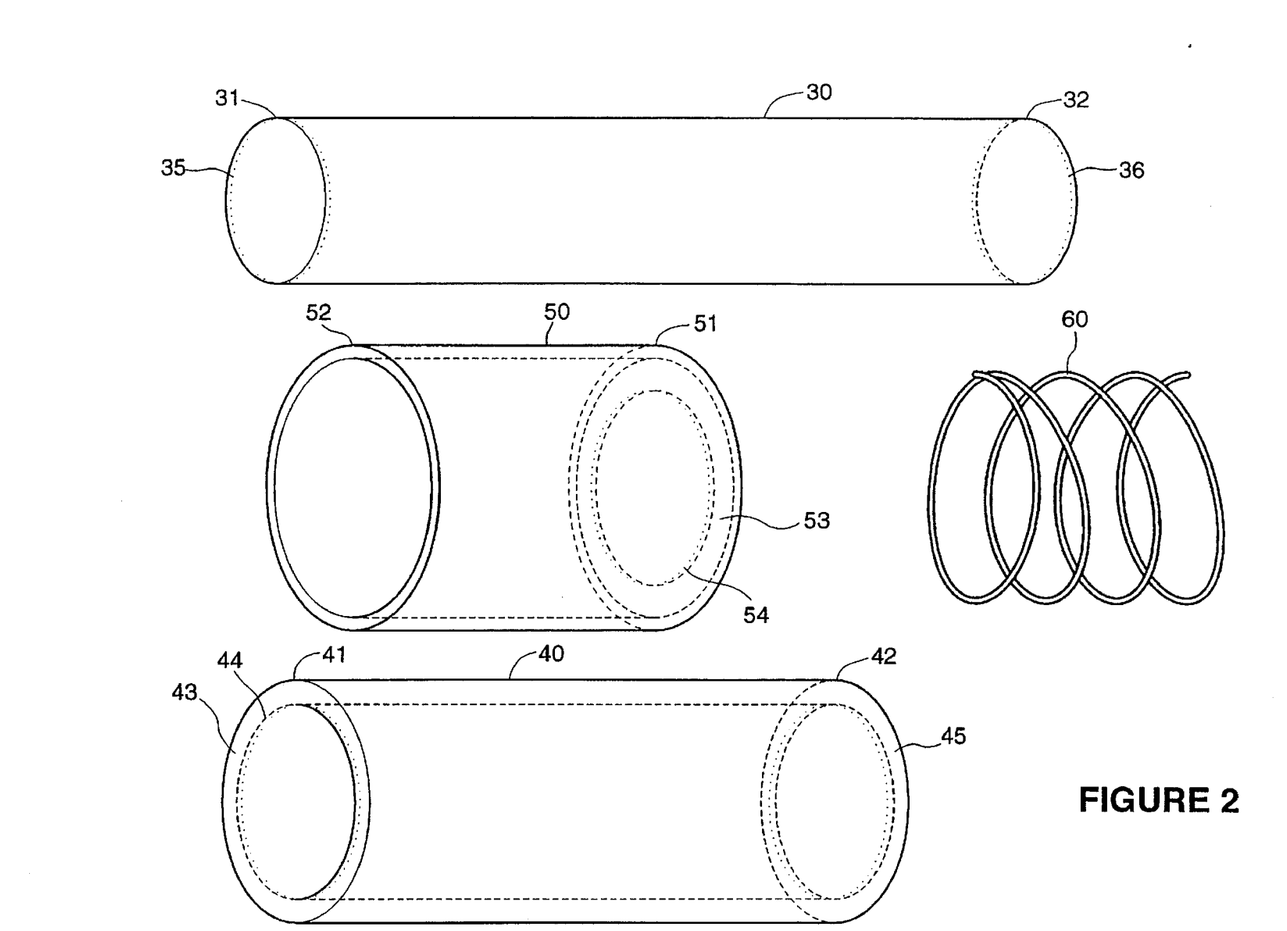
FIG. 2 is a diagrammatic perspective view of the parts of the clamping device as shown in FIG. 1.

The gripping member 30 has a first end 31 and a second end 32 defining the full length of the gripping member 30 when the gripping member 30 is in its straight neutral configuration. Further, the first and second ends 31 and 32 define a corresponding reduced length when the gripping member 30 is in any of its respective helically twisted configurations.

A first handle member 40 has a first end 41, a second end 42, a first inwardly directed flange member 43 disposed at the first end 41 thereof and a second inwardly directed flange member 45 disposed at the second end 42 thereof. The first handle member 40 is secured to the first end 31 of the gripping member 30 by way of robust stitching 33 sewn through apertures 35 in the first end 31 of the gripping member 30 and through apertures 44 in the first inwardly directed flange member 43 of the first handle member 40. Similarly, a second handle member 50 has a first end 51, a second end 52, and a first inwardly directed flange member 53 disposed at the first end 51 thereof. The second handle member 50 is secured to the second end 32 of the gripping member 30 by way of robust stitching 34 sewn through apertures 36 in the second end 32 of the gripping member 30 and through apertures 54 in the first inwardly directed flange member 53 of the second handle member 50. The interior of each of the first handle member 40 and the second handle member 50 is substantially hollow to permit the inserted member 22 to enter thereinto. Robust stitching 33 and 34 sewn through apertures 35 and 36 can be replaced by cylindrical caps overlapping on the gripping member 30 and holding it in place, securing it to the first end 41 of the first handle member and the first end 51 of the second handle member.

The outside diameter of the first handle member 40 is slightly greater than the inside diameter of the 50. The second end 52 of the first handle member 40 is freely slidably engaged within the second handle member 50 for movement between an extended position whereat the 30 is in its straight neutral configuration and a compressed configuration whereat the first handle member 40 is fully slidably engaged within the second handle member 50. Preferably, the first and second handle members 40 and 50 are not retained in wobbly relation, one with the other, as this would produce an ill-fitting clamping device 20 that would not work well.

A spring biasing means in the form of a coil spring 60 is fully retained within the second handle member 50 and engages the second inwardly directed flange member 45 at the second end 42 of the first handle member 40, and also engages the first inwardly directed flange member 53 at the first end 51 of the second handle member 50. The coil spring 60 is retained in compression so as to bias the first and second handle members 40 and 50 apart one from the other, thereby urging the gripping member 30 to a taut condition. The coil spring 60 is thereby operatively interconnected between the first handle member 40 and the second handle member 60.

In the preferred embodiment, the full length of the gripping member 30—with the gripping member 30 in its straight neutral configuration—is less than the length of the first handle member 40 and the second handle member 50, combined. The grip member 30 acts as a stop member to preclude the separation of the first handle member 40 and the second handle member 50 as caused by the compressed coil spring 60. Accordingly, the gripping member 30 acts as a stop member to preclude the first handle member 40 from being pulled out of the second handle member 50. The gripping member 30 is taut in its straight neutral configuration, as caused by the coil spring 60 and the coil spring 60 is caused to remain in compression.

The first and second handle members 40 and 50 are generally cylindrical in shape and circular in cross-section, so as to permit longitudinal movement of one with respect to the other along the first longitudinal axis "A", and also to permit free rotation of one with respect to the other about the first longitudinal axis "A". The first and second handle members 40 and 50 are operatively engaged one with the other, with the second end 42 of the 40 being disposed internally of the 50, for relative rotational movement one with respect to the other about the first longitudinal axis "A", between a plurality of adjustment positions. Such rotational movement causes the gripping member 30 to twistably deform between its neutral configuration and its helically twisted configurations, with said helically twisted configuration each corresponding to one of said plurality of adjustment positions. Such deformation to its helically twisted configurations causes the gripping member 30 to decrease in diameter, especially at its middle portion, so as to collapse onto the inserted member 22.

In the same preferred embodiment, the first handle member 40 and the second handle member 50 are infinitesimally adjustable with respect to one another between the aforesaid plurality of adjustment positions. Accordingly, there is a continuum of adjustment positions.

The coil spring 60 frictionally engages the second inwardly directed flange member 45 at the second end 42 of the first handle member 40 and also frictionally engages the first inwardly directed flange member 53 at the first end 51 of the second handle member 50. The friction between the coil spring 60 and the second inwardly directed flange member 45, and between the coil spring 60 and the first inwardly directed flange member 53, as caused by the compressive forces of the coil spring 60, permits retention of the first handle member 40 and the second handle member 50 in any of the aforesaid plurality of adjustment positions. The friction is not so considerable, however, so as to preclude hand-manipulated turning of the first handle member 40 with respect to the second handle member 50.

In an alternative embodiment, it is possible to have the first handle member 40 and the second handle member 50 engage one another, either directly or indirectly, at opposed cooperating cam members or teeth, which would preclude the relative rotation of the first handle member 40 and the second handle member 50 with respect to one another, so as to thereby permit retention of the first handle member 40 and the second handle member 50 with respect to one another, thereby providing for incremental adjustability.

In use, when the first handle member 40 and the second handle member 50 are in a selected one of the aforesaid plurality of adjustment positions, the gripping member 30 is caused to be in a corresponding helically twisted configuration. The first handle member 40 and the second handle member 50 are retained in the selected adjustment position by frictional engagement of each with the coil spring 60. In any of its helically twisted configurations, the gripping member 30 collapses onto the inserted member 22 so as to frictionally engage the inserted member 22. The amount of frictional engagement between the gripping member 30 and the inserted member 22 depends on the amount of twisting of the gripping member 30 around the inserted member 22. Further, the amount of frictional engagement depends on the co-efficient of friction between the two materials, and also depends on the overall surface roughness of the two materials. A relatively low friction material such as polyethylene or nylon may be in the form of a braided rope for the inserted member 22, or it may be in the form of a mesh material gripping member, and therefore have a rough surface which would tend to grip well.

The amount of frictional engagement of the gripping member 30 onto the inserted member 22 defines the amount of pulling force that it will take to make the inserted member 22 move in the direction of the first longitudinal axis "A" within the clamping device 20. Initially, when the force is first applied, the inserted member 22 does not move until an initial threshold force is reached in order to overcome the stiction between the inserted member 22 and the gripping member 30. Once the initial threshold force is reached, thus overcoming the stiction, the inserted member 22 can move along the first longitudinal axis "A". Unexpectedly, it has been found that the frictional engagement realized when pulling the inserted member 22 in a direction as indicated by arrow "B" in FIG. 1, while holding the second handle member 50, is much greater than when pulling the inserted member 22 in a direction as indicated by arrow "C" in FIG. 1, while holding the second handle member 50. More specifically, pulling of the inserted member 22 in a first direction along the first longitudinal axis "A" as indicated by arrow "B" in FIG. 1, causes the gripping member 30 to further collapse onto the inserted member 22. Accordingly, the gripping member 30 engages the inserted member 22 with correspondingly tighter frictional engagement. Thus, the harder the inserted member 22 is pulled on the more the gripping member 30 resists the pulling of the inserted member 22. It has been found that the increase in frictional engagement is generally linearally proportional to the increase in pulling force on the inserted member 22. Resultingly, the speed at which the inserted member 22 can move through the gripping member 30 is relatively constant.

Further, speed at which the inserted member 22 can move through the gripping member 30 can be pre-set to a desired amount by adjusting the first handle member 40 and the second handle member 50 with respect to one another to a corresponding adjustment position.

It can therefore be seen that the clamping device 20 of the present invention can be used in an apparatus where a moveable element is to move along an elongate element, such as a rope or a ladder, at a relatively constant speed, irrespective of the force applied to the moveable element. Examples of such devices might include emergency devices for high-rise buildings, and exercise equipment, among others.

Figure 7:
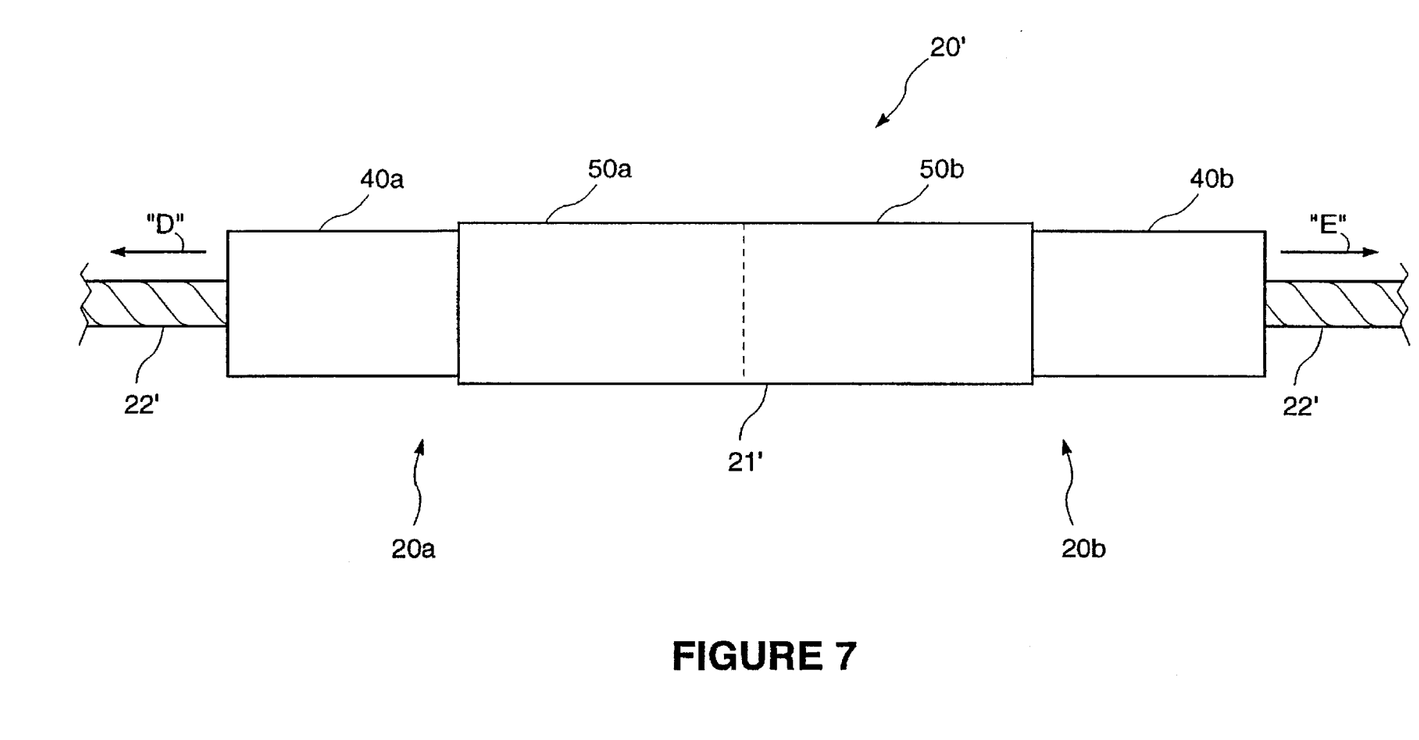
FIG. 7 is a diagrammatic view of a dual clamping device for bi-directional clamping of an inserted member.

If the inserted member 22 is pulled in the opposite other direction, as indicated by arrow "C" in FIG. 1, then the gripping member 30 is shortened slightly. Correspondingly, the frictional engagement of the gripping member 30 on the inserted member 22 is proportionately relaxed, thus causing the inserted member 22 to be readily slidable within the gripping member 30. In this sense, the basic clamping member 20 of the present invention is essentially unidirectional. If a bi-directional device is required, then two clamping devices 20 can be used in unison, as illustrated in FIG. 7. The bi-directional clamping device 20' comprises two clamping devices 20'a and 20'b, shown separated by a dotted line, and receives an inserted member 22' therein for frictional engagement therewith. In use, the bi-directional clamping device 20' is held at its middle portion 21', which middle portion 21' corresponds to the second handle member 50a and 50b in each single clamping device 20a and 20b, and the inserted member 22' is pulled in either direction as indicated by arrows "D" and "E". If the inserted member 22' is pulled in the direction as indicated by arrow "D", the corresponding axial movement of the inserted member 22' within the bi-directional clamping device 20' is resisted by the single clamping device 20a, and is adjustable by rotating the first handle member 40a with respect to the middle portion 21'. If the inserted member 22' is pulled in the direction as indicated by arrow "E", the corresponding axial movement of the inserted member 22' within the bi-directional clamping device 20' is resisted by the single clamping device 20b, and is adjustable by rotating the first handle member 40b with respect to the middle portion 21'.

As described above, if the first handle member 40 and the second handle member 50 are rotatably moved to an adjustment position that causes frictional engagement of the gripping member 30 onto the inserted member 22 of less than the threshold amount then the inserted member 22 may be pulled in a direction as indicated by arrow "B" through the clamping device 20; however, if the first handle member 40 and the second handle member 50 are rotatably moved to an adjustment position that causes frictional engagement of the gripping member 30 onto the inserted member 22 of more than the threshold amount then the inserted member 22 is precluded from being pulled in a direction as indicated by arrow "B" through the clamping device 20.

It can therefore be seen that there is a threshold adjustment position of the first handle member 40 and the second handle member 50 with respect to one another, whereat the force of the gripping member 30 on the inserted member 22 is greater than the threshold force required to move the inserted member 22 within the gripping member 30. Further, as a pulling force is applied to the inserted member 22, the frictional engagement of the gripping member 30 on the inserted member 22 increases, thereby increasing the frictional force on the inserted member 22 that resists the movement of the inserted member 22 along the first longitudinal axis "A" within the gripping member 30. Accordingly, the inserted member 22 is precluded from being pulled in the direction as indicated by arrow "B", irrespective of the pulling force acting on the inserted member 22.

Other modifications and alterations may be used in the design and manufacture of the apparatus of the present invention without departing from the spirit and scope of the accompanying claims.

What is claimed is:

1. An adjustable clamping device for receiving and selectively frictionally engaging an internally disposed inserted member, said clamping device comprising:

a flexible and readily deformable elongate gripping member having a generally hollow cylindrical shape, disposed about a generally centrally located first longitudinal axis;

wherein said flexible and readily deformable elongate gripping member is twistably deformable between a straight neutral configuration and a helically twisted configuration;

wherein said flexible and readily deformable elongate gripping member has a first end and a second end, which first and second ends define a full length when said flexible and readily deformable elongate gripping member is in said straight neutral configuration and which first and second ends define a corresponding proportionally reduced length when said flexible and readily deformable elongate gripping member is in said helically twisted configuration;

a first handle member secured to said first end of said flexible and readily deformable elongate gripping member and a second handle member secured to said second end of said flexible and readily deformable elongate gripping member, with said first and second handle members being operatively engaged one with the other for relative rotational movement one with respect to the other about said first longitudinal axis, to any one of a plurality of adjustment positions, which rotational movement causes said flexible and readily deformable elongate gripping member to twistably deform between said straight neutral configuration and said helically twisted configuration; and spring biasing means operatively interconnected between said first and second handle members so as to bias said first and second handle members, thereby urging said flexible and readily deformable elongate gripping member to a taut condition while in said helically twisted configuration;

wherein, in use, when said first and second handle members are in a selected one of said plurality of adjustment positions so as to cause said flexible and readily deformable elongate gripping member to be in a corresponding helically twisted configuration, said flexible and readily deformable elongate gripping member is correspondingly peripherally contracted around said inserted member so as to frictionally engage said inserted member.

2. The adjustable clamping device of claim 1, wherein said flexible and readily deformable elongate gripping member comprising a substantially solid sheet of flexible material.

3. The adjustable clamping device of claim 2, wherein the material of said flexible and readily deformable elongate gripping member is chosen from the group consisting of leather, rubber, synthetic rubber, neoprene, nylon, and cloth.

4. The adjustable clamping device of claim 1, wherein said flexible and readily deformable elongate gripping member comprises a plurality of flexible strand members.

5. The adjustable clamping device of claim 4, wherein the material of said strand members is chosen from the group consisting of leather rubber, synthetic rubber, neoprene, cloth, nylon, rayon, kevlar, and metal.

6. The adjustable clamping device of claim 1, wherein said flexible and readily deformable elongate gripping member comprises a mesh material.

7. The adjustable clamping device of claim 6, wherein said material comprising said flexible and readily deformable elongate gripping member is chosen from the group consisting of leather, rubber, synthetic rubber, neoprene, cloth, nylon, rayon, kevlar, and metal.

8. The adjustable clamping device of claim 1, wherein said full length of said flexible and readily deformable elongate gripping member is about five times its diameter in its straight neutral configuration.

9. The adjustable clamping device of claim 1, wherein said first and second handle members have respective first and second ends, with said flexible and readily deformable elongate gripping member being attached to said first and second handle members adjacent said respective first ends and wherein second end of said first handle member is freely rotatably engaged within said second handle member.

10. The adjustable clamping device of claim 1, wherein said first and second handle members comprise respective first and second outer walls generally encircling a substantially hollow interior.

11. The adjustable clamping device of claim 10, wherein said first and second handle members are generally cylindrical in shape.

12. The adjustable clamping device of claim 11, wherein said first and second handle members are generally circular in cross-section.

13. The adjustable clamping device of claim 1, wherein said spring biasing means is retained within said second handle member.

14. The adjustable clamping device of claim 13, wherein said spring biasing means comprises a coil spring engaging said second end of said first handle member and said first end of said second handle member.

15. The adjustable clamping device of claim 14, wherein said coil spring frictionally engages each of said first and second handle members so as to permit retention of said first and second handle members in any of said plurality of adjustment positions.

16. The adjustable clamping device of claim 15, wherein said coil spring is in compression when said flexible and readily deformable elongate gripping member is in said straight neutral configuration.

17. The adjustable clamping device of claim 1, wherein said spring biasing means is in compression when said flexible and readily deformable elongate gripping member is in said straight neutral configuration.

18. The adjustable clamping device of claim 1, wherein said first handle member and said second handle member are infinitesimally adjustable one with respect to the other between said plurality of adjustment positions.

* * * * *